United States Patent

Park

[11] Patent Number: 5,990,642
[45] Date of Patent: Nov. 23, 1999

[54] METHOD AND APPARATUS FOR DRIVING A SENSORLESS DC MOTOR HAVING A BRIDGE-TYPE INDUCTANCE DETECTING CIRCUIT

[75] Inventor: Jong-Yong Park, Seoul, Rep. of Korea

[73] Assignee: Daewoo Electronics Co., Ltd., Seoul, Rep. of Korea

[21] Appl. No.: 09/092,915

[22] Filed: Jun. 8, 1998

[51] Int. Cl.⁶ .............................. H02P 1/00; H02P 7/00; H02P 1/18
[52] U.S. Cl. .......................... 318/254; 318/138; 318/439
[58] Field of Search .................................. 318/138, 245, 318/246–293, 439; 363/78

[56] References Cited

U.S. PATENT DOCUMENTS

| | | | |
|---|---|---|---|
| 4,888,533 | 12/1989 | Gotoh et al. | 318/254 |
| 5,159,246 | 10/1992 | Ueki | 318/254 |
| 5,189,349 | 2/1993 | Haga | 318/254 |
| 5,191,270 | 3/1993 | McCormack | 318/254 |
| 5,206,567 | 4/1993 | Sakurai et al. | 318/439 |
| 5,235,264 | 8/1993 | Kaneda et al. | 318/727 |
| 5,327,053 | 7/1994 | Mann et al. | 318/254 |
| 5,446,354 | 8/1995 | Hiruma | 318/439 |
| 5,608,300 | 3/1997 | Kawabata et al. | 318/721 |

FOREIGN PATENT DOCUMENTS

| | | |
|---|---|---|
| 0 490 395 | 6/1992 | European Pat. Off. . |
| 0 817 364 | 1/1998 | European Pat. Off. . |
| 2 528 184 | 12/1983 | France . |
| 2 226 465 | 6/1990 | United Kingdom . |

*Primary Examiner*—Paul Ip
*Attorney, Agent, or Firm*—Pillsbury Madison & Sutro LLP

[57] ABSTRACT

A method and an apparatus for driving a sensorless DC motor having a bridge-type inductance detecting circuit. The method of driving a sensorless DC motor including a rotor having Y-winding phase coils and a plurality of magnetic poles comprises the steps of applying an alternating current voltage signal to bridge circuits coupled to the phase coils, respectively, inputting an output voltage signal of each bridge circuit as an inductance detecting signal of each phase coil, amplifying the inputted inductance detecting signal of each phase coil, comparing a value of the amplified inductance detecting signal of each phase coil to each other, and determining an initial position of the rotor for rotating the rotor, the phase coils except for a phase coil having a maximum inductance detecting signal being magnetized at the initial position. By the method, the initial position of the rotor can be precisely detected even when the rotor is rotated at a low speed or in a stop state, so the motor is reliably driven.

19 Claims, 13 Drawing Sheets

STATOR (PHASE COILS)

ROTOR (MAGNET)

METHOD AND APPARATUS FOR DRIVING A SENSORLESS DC MOTOR HAVING A BRIDGE-TYPE INDUCTANCE DETECTING CIRCUIT

BACKGROUND OF THE INVENTION

1. Field of the Invention

The present invention relates to a method and an apparatus for driving a sensorless DC motor having a bridge-type inductance detecting circuit, and more particularly, to a method and an apparatus for driving a sensorless DC motor having a bridge-type inductance detecting circuit which detects an inductance based on a relative position of a phase-coil with respect to a magnetic rotor thereby determining a rotor position.

2. Description of the Prior Art

A video cassette recorder (VCR) includes a capstan motor and a head drum motor. Conventionally, in order to drive those motors, it is required to determine the rotor position by using sensors such as a HALL sensor or an optical sensor in such a manner that a phase curve applied to motors can be controlled according to the rotor position. However, the conventional method requires a space for installing sensors. In addition, the sensors are so expensive that the cost of an article is increased.

Recently, a sensorless motor has become widely used for overcoming the above problems.

In the conventional sensorless motor, as disclosed in U.S. Pat. No. 5,235,264, a rotor's commutation is determined by detecting a back electromotive force (BEMF) induced into the phase coil thereby determining the magnetic rotor's position.

The back electromotive force induced into the coil is in proportion to a rotational velocity of the rotor. Therefore, if the rotor is rotated at a lower speed or in a stop-state, detecting the back electromotive force is very difficult. Accordingly, the method using the back electromotive force requires the rotor to rotate over a predetermined speed so as to sufficiently detect the back electromotive force, otherwise, the commutation of the rotor is unstably controlled.

SUMMARY OF THE INVENTION

The present invention has been made to overcome the above described problems of the prior art. Accordingly, it is an object of the present invention to provide a method and an apparatus for driving a sensorless DC motor which can detect an inductance of a phase coil based on a relative position of the phase-coil with respect to a magnetic rotor thereby precisely determining an initial position of the rotor even when the rotor rotates at a low speed or in a stop state.

In order to accomplish the above object, the present invention provides a method of driving a sensorless DC motor including a rotor having Y-winding phase coils and a plurality of magnetic poles, the method comprising the steps of:

applying an alternating current voltage signal to bridge circuits which are respectively coupled to the phase coils;

inputting an output voltage signal of each of the bridge circuits as an inductance detecting signal of each of the phase coils;

amplifying the inputted inductance detecting signal of each of the phase coils;

comparing a value of the amplified inductance detecting signal of each of the phase coils to each other; and determining an initial position of the rotor for rotating the rotor, the phase coils except for a phase coil having a maximum inductance detecting signal being magnetized at the initial position.

The present invention also provides an apparatus for driving a sensorless DC motor including a rotor having Y-winding phase coils and a plurality of magnetic poles, the apparatus comprising:

an alternating current voltage source for providing an alternating current voltage signal;

bridge circuits which receive the alternating current voltage signal so as to detect a differential voltage signal between a reference voltage signal and a terminal voltage signal of the phase coils thereby outputting an inductance detecting signal, the bridge circuits being respectively connected to the phase coil;

amplifiers for amplifying each inductance detecting signal of each of the bridge circuits;

a commutation control section for comparing a value of the amplified inductance detecting signal of each of the phase coils with each other, for determining an initial position in which the phase coils except for a phase coil having a maximum inductance detecting signal are magnetized and for determining a commutation by comparing the values of the inductance detecting signals at each predetermined rotary angle of the rotor with each other; and a driving section for providing a driving current to a pair of phase coils in response to a control signal of the commutation control section.

Each of bridge circuits comprises a first input terminal which is connected to a first terminal of the alternating current voltage source and is a common connection point of the Y-winding, a second input terminal connected to a second terminal of the alternating current voltage source, a first resistance and a first capacitor which are connected between the first and second input terminals in a series, a second resistance and a second capacitor which are connected between a first terminal of each phase coil and the first terminal of the alternating current voltage source in a series, a first output terminal provided at the first terminal of each phase coil, and a second output terminal which is a common connection point of the first resistance and capacitor.

According to another embodiment of the present invention, there is provided a method of driving a sensorless DC motor including a rotor having center-tapped winding phase coils and a plurality of magnetic poles, the method comprising the steps of:

sequentially applying an alternating current voltage signal to bridge circuits which are respectively coupled to pairs of the phase coils;

inputting an output voltage signal of each of the bridge circuits as a differential inductance detecting signal of each of the pairs of the phase coils;

amplifying the inputted differential inductance detecting signal of each of the pairs of the phase coils;

comparing the value of the amplified differential inductance detecting signal of each of the pairs of the phase coils with each other; and determining an initial position of the rotor for rotating the rotor, the phase coils except for a phase coil having a maximum differential inductance detecting signal being magnetized at the initial position.

According to another embodiment of the present invention, there is provided an apparatus for driving a sensorless DC motor including a rotor having center-tapped winding phase coils and a plurality of magnetic poles, the apparatus comprising:

an alternating current voltage source for providing an alternating current voltage signal;

bridge circuits which receive the alternating current voltage signal so as to detect a differential voltage signal between a reference voltage signal and a terminal voltage signal of the phase coils thereby outputting a differential inductance detecting signal, the bridge circuits being connected to a pair of the phase coils;

amplifiers for amplifying each differential inductance detecting signal of each of the bridge circuits;

a commutation control section for comparing a value of the amplified differential inductance detecting signal of each of the pairs of the phase coils with each other, for determining an initial position in which the phase coils except for a pair of phase coils having a maximum differential inductance detecting signal are magnetized, and for determining a commutation by comparing the values of the differential inductance detecting signals at each predetermined rotary angle of the rotor with each other; and a driving section for providing a driving current to each of the phase coils in response to a control signal of the commutation control section.

Each of the bridge circuits comprises a first input terminal which is connected to a first terminal of the alternating current voltage source and is center-tapped, a second input terminal connected to a second terminal of the alternating current voltage source, first and second resistances which are connected between a first terminal of each of the phase coils and the second input terminal, and first and second output terminals which are provided at first terminals of a pair of phase coils connected to first and second resistances, respectively.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, the structure and the operation of an apparatus for driving a sensorless DC motor according to preferred embodiments of the present invention will be explained in more detail with reference to the accompanying drawings.

Figure 1:
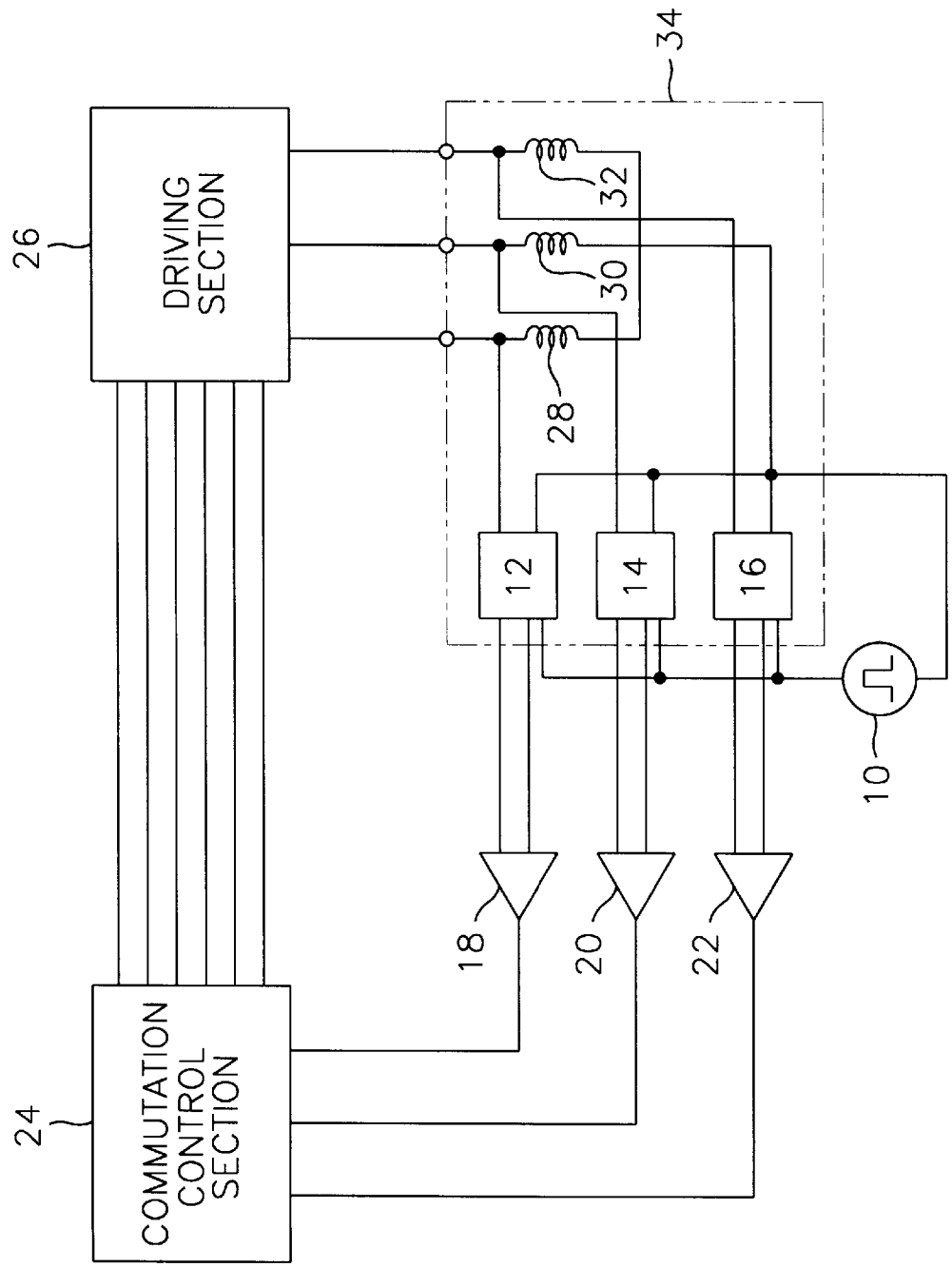
FIG. 1 is a circuit diagram of a sensorless motor having an Owen bridge circuit according to one embodiment of the present invention.

FIG. 1 shows a circuit for driving a sensorless DC motor having an Owen's bridge according to the present invention. The circuit shown in FIG. 1 includes an AC voltage source 10, bridge circuits 12, 14 and 16, amplifiers 18, and 20, a commutation control section 24, a driving section 26, and Y-winding phase coils 28, 30 and 32.

When a rotor rotates, a driving current flows through the phase coils of the motor. Due to an ohmic loss, a temperature thereof increases in response to an increase of a running time. The temperature increase increases a resistance of the phase coils. A resistivity of cooper follows the temperature change linearly. This destroys a balanced state of the Owen's bridge and does not allow an output voltage of an inactive phase coil to determine a position of the rotor. Thus, in order to compensate for the unbalanced state of the bridge circuit due to the temperature increase caused by the ohmic loss of the phase coils, properly, the phase coils and the bridge circuits are installed in a motor case 34 together.

Figure 2:
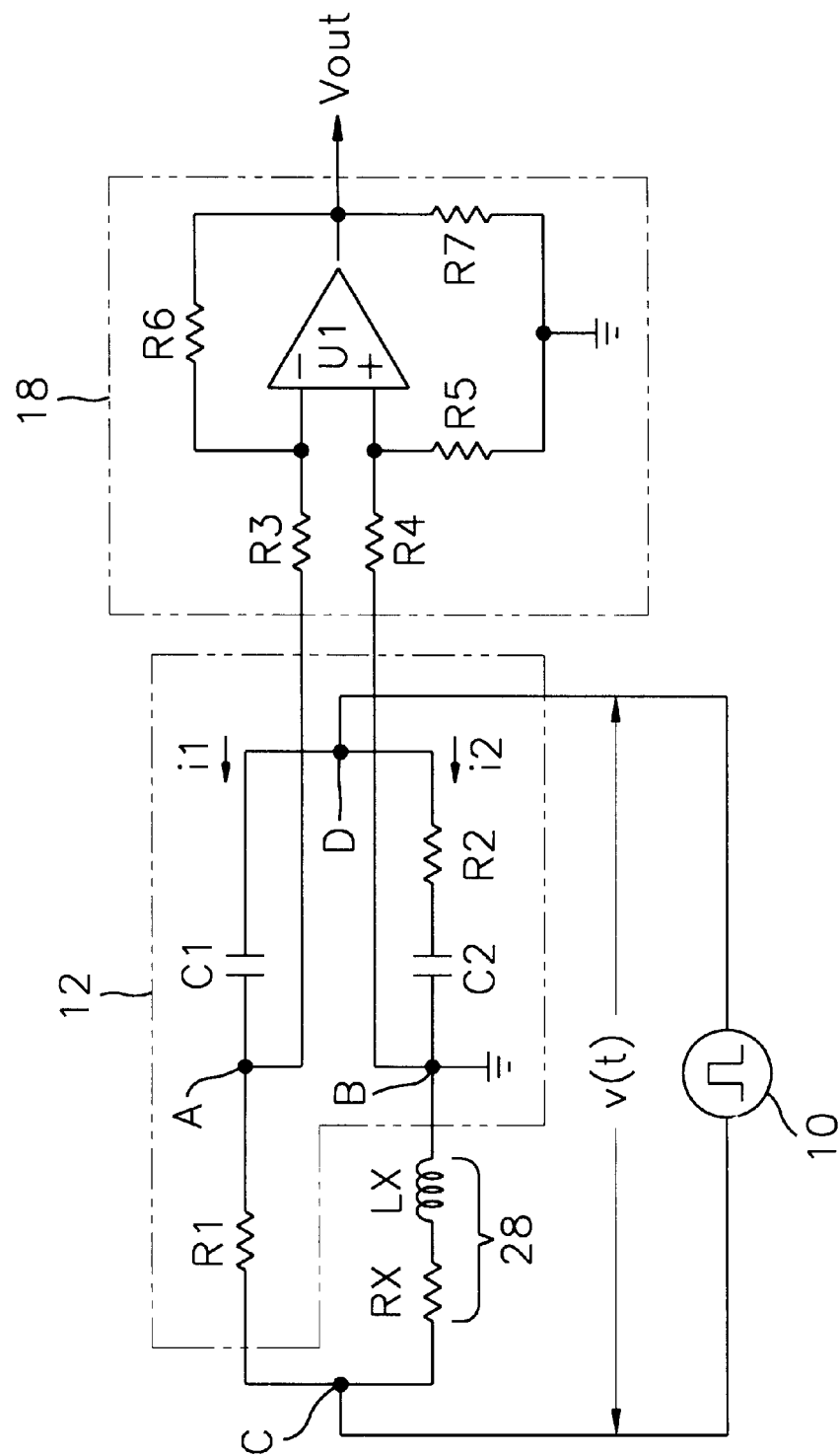
FIG. 2 is a detailed circuit diagram of the Owen bridge circuit shown in FIG. 1.

FIG. 2 shows a bridge circuit of one phase coil and a detailed circuit diagram of an amplifier.

A bridge circuit 12 includes a first input node C which is a commonly connected point of a Y-winding and is connected to one node of an AC voltage source 10, a second input node D connected to the other node of AC voltage source 10, a first resistor R1 and a first capacitor C1 positioned in series between first and second input nodes C and D, a second capacitor C2 and a second resistor R2 positioned in series between one node of phase coil 28 and one node of AC voltage source 10, a first output node B which is one node of phase coil 28, and a second output node A which is commonly connected point of first resistor R1 and first capacitor C1. Phase coil 28 includes an inner resistor Rx and an inductor Lx.

Amplifier 18 is an operational amplifier U1 which is connected at a non-inversion terminal thereof to first output node B through a resistor R4, and is connected at an inversion terminal thereof to second output node A through a resistor R3. The non-inversion terminal of operational amplifier U1 is earthen through a resistor R5 and an output terminal thereof is earthen through a resistor R7. Between the inversion terminal and the output terminal, a resistor R6 is connected. Resistors R3 and R4 have the same resistance and resistors R5 and R6 have a resistance which is m times the resistance of R3 and R4.

For obtaining each circuit parameter of bridge circuit 18, an inductance variation which has a resistance of 22.5Ω and an inductance in a range of 813–846 $\mu$H with respect to phase coil 28. Based an the above information, resistance of R1 and R2 and capacitance of C1 and C2 at a balanced state can be determined.

Voltage characteristic equations of the bridge system in response to an applied AC voltage v(t) are as follows.

$$v(t) = R_1 i_1 + \frac{1}{c_1} \int i_1 dt \qquad (1)$$

$$v(t) = R_x i_2 + L_x \frac{di_2}{dt} + \frac{1}{c_2} \int i_2 dt + R_2 i_2 \qquad (2)$$

By equations (1) and (2), $i_1$ and $i_2$ are determined. And, voltages $V_A(t)$ and $V_B(t)$ are determined as follows.

$$v_A(t) = v(t) - R_1 i_1 \qquad (3)$$

$$v_B(t) = v(t) - R_x i_2 - L_x \frac{di_2}{dt} \qquad (4)$$

In a balanced state, the voltage of output node A equals the voltage of output voltage of node B. Thus, there is no voltage differential between the two output nodes.

Figure 3A:
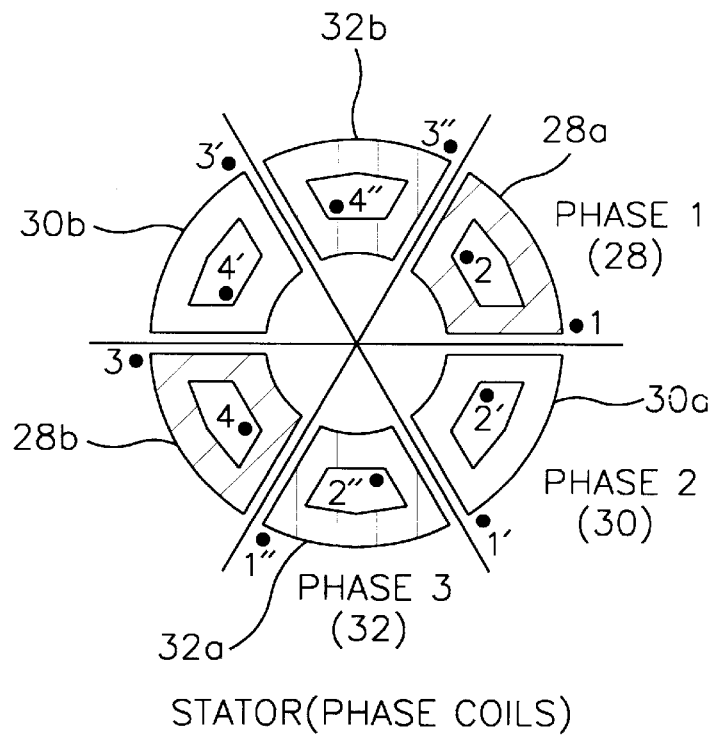
FIG. 3A is a sectional plan view showing phase coils of a stator.
Figure 3B:
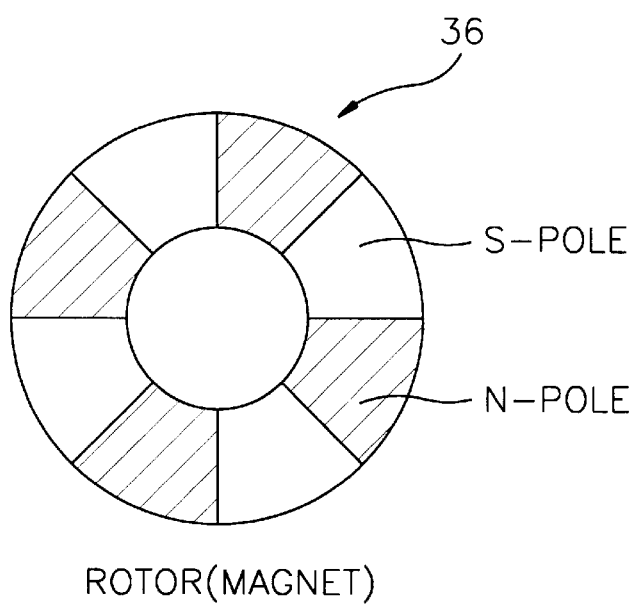
FIG. 3B is a sectional plan view showing a magnetic rotor.

FIGS. 3A and 3B show the arrangement of phase coils 28, 30 and 32 and a magnetic rotor 36. Each of phase coils 28, 30 and 32 includes three couples of coils 28a and 28b, 30a and 30b, and 32a and 32b, each couple of which are oppositely positioned. Accordingly, the six coils are arranged in such a manner that they occupy conical areas angularly extending 60 degrees. Magnetic rotor 36 has eight magnetic poles which concentrically occupy conical areas angularly extending forty-five degrees. Magnetic poles are positioned such a manner that N-pole and S-pole are alternatively positioned.

Therefore, when the phase coils and the magnetic rotor are installed in an overlapped position as shown in FIG. 3 and FIG. 3A, phase coil 28 is overlapped at a large portion thereof by the S-pole and phase coil 30 is overlapped at a large portion thereof by the N-pole, while phase coil 32 is overlapped at a half portion thereof by the N-pole and at the remaining half portion thereof by the S-pole.

When rotor 36 rotates at this state, a magnetic field thereof is varied so that the inductances of the phase coils are changed and a voltage differential between the two output nodes is generated. However, the voltage differential is too small to be used. Thus, for amplifying the signal thereof, a differential amplifier 18 is used.

An output voltage Vout of the differential amplifier is as follows.

$$V\text{out} = m(V_A - V_B) \qquad (5)$$

Here, m is a gain of the differential amplifier, which is mR/R.

AC voltage source 10 is a voltage source generating a rectangular wave having 10V, 100 kHz and a duty ratio of 25%.

Figure 4:
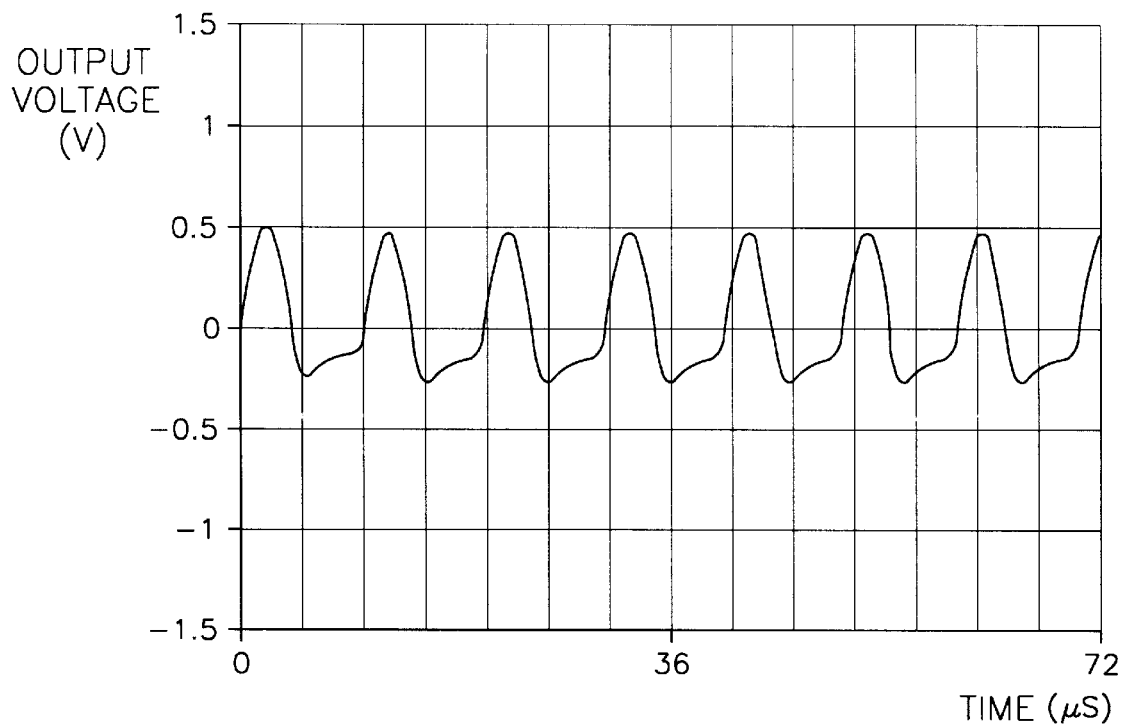
FIG. 4 is a graph showing a wave form of an output voltage of a bridge circuit when an inductance of the phase coil is 835 $\mu$H.
Figure 5:
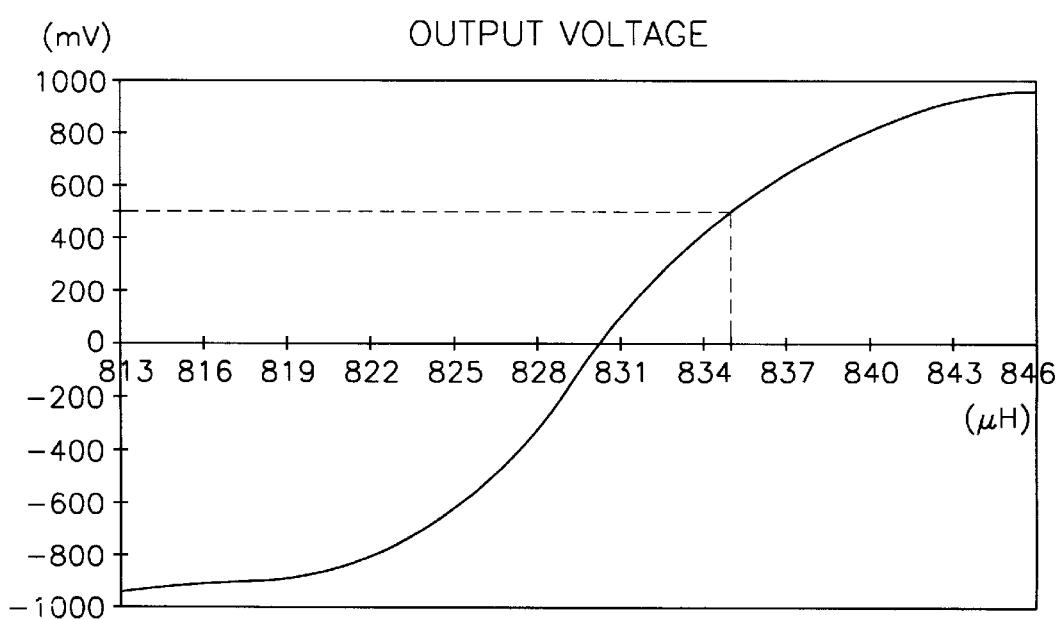
FIG. 5 is a graph showing an output voltage characteristic according to an inductance of the phase coil.

FIG. 4 shows an amplified output voltage of the bridge circuit wherein the inductance of the phase coil is 835 $\mu$H, and FIG. 5 shows an output voltage characteristics with respect to the inductance of the phase coil.

Referring to FIG. 5, in a case of the inductance being higher than 830 $\mu$H, the absolute value of a maximum voltage is higher than the absolute value of a minimum voltage. But, in a case of the inductance being lower than 830 $\mu$H, a contrary result occurs. The output voltage following the inductance is detected after a 62.5 $\mu$s lapse. That is, preferably, the output voltage is detected after six cycles are applied to the system in order to neglect a transition state.

Figure 6:
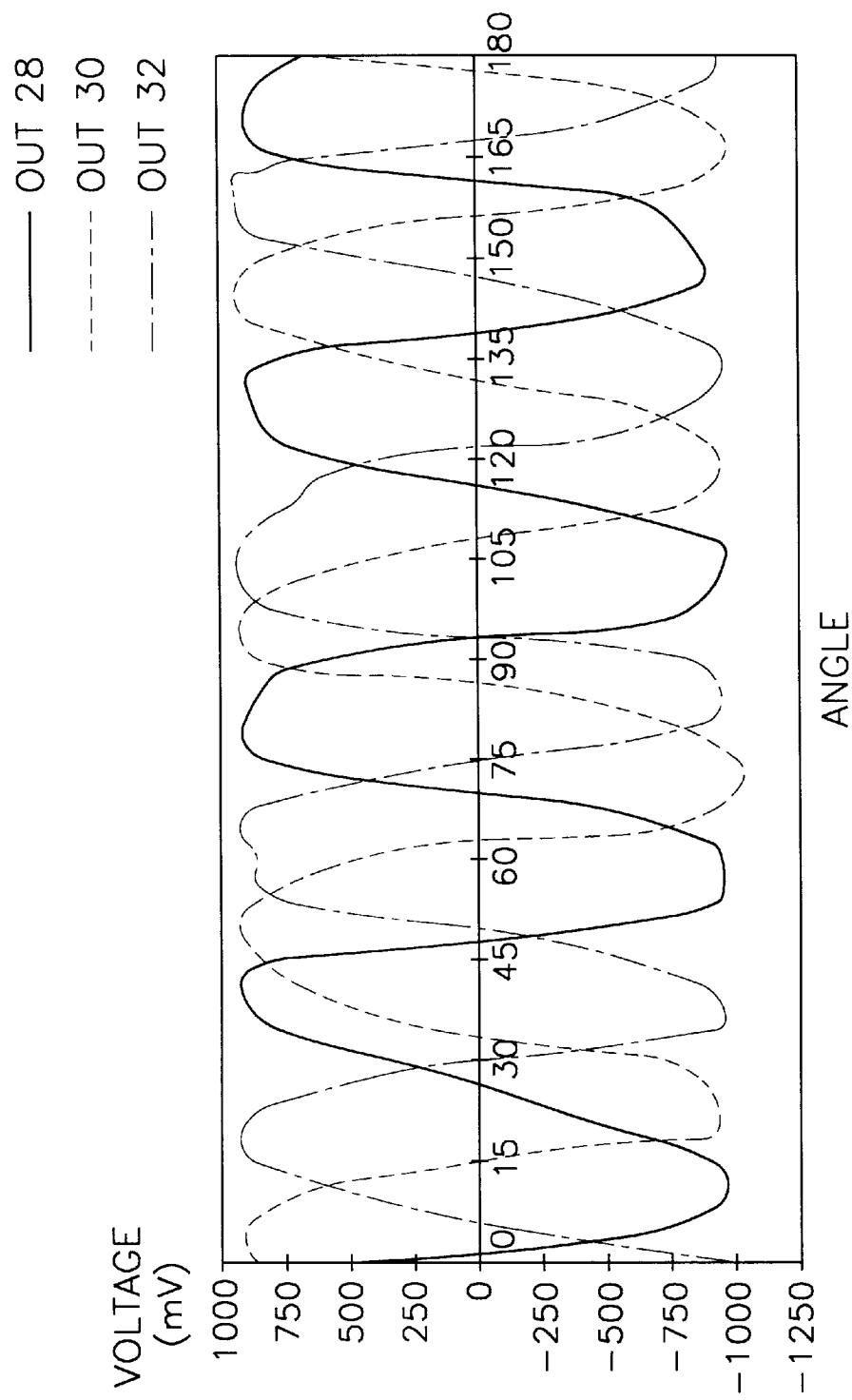
FIG. 6 is a graph showing a wave form of an amplified inductance output voltage of each phase coil corresponding to rotary angles of the magnetic rotor.

FIG. 6 is a waveform diagram which shows the output voltage of each phase coil in response to a rotation angle of the magnetic rotor. The solid line represents the output voltage of phase coil 28, the dotted line represents that of phase coil 30, and the one-dot chain line represents that of phase coil 32.

In 8-poles and 3 phases (6 coils) motor, a phase commutation must be carried out at each 15 degrees rotation of the rotor. As shown in FIG. 6, voltage profiles of three phases are distinctly separated and at each degree, the voltage of one phase is higher than that of the remaining two phases.

Commutation control section 24 compares the amplitudes of the amplified inductance detected signals of the phase coils and determines that the remaining two phase coils except one phase coil having the highest voltage amplitude are returned to an initial position where the two phase coils are magnetized.

In a stop state, input signals are sequentially applied to the three phase coils. Then, the return signals are amplified so as to be detected at a predetermined time. After the voltage amplitudes of three phases are compared to each other, the phase coils are magnetized according to the highest or lowest voltage.

When the motor is actuated by a proper commutation determination, the rotation of the rotor is carried out.

If the inductance detected signal of phase coil 28 is higher than those of phase coils 30 and 32, commutation control section 24 controls a driving section 26 so as to supply driving currents to phase coils 30 and 32 for rotating the rotor. Then, since the inductance detected signal of phase coil 30 is the highest at a rotating angle of 15 degrees, phase coils 28 and 32 are magnetized. When the rotor rotates, the inactive coil serves as a sensor. The magnetization of the corresponding phase coil must be carried out while the output voltage is in some range.

Figure 7:
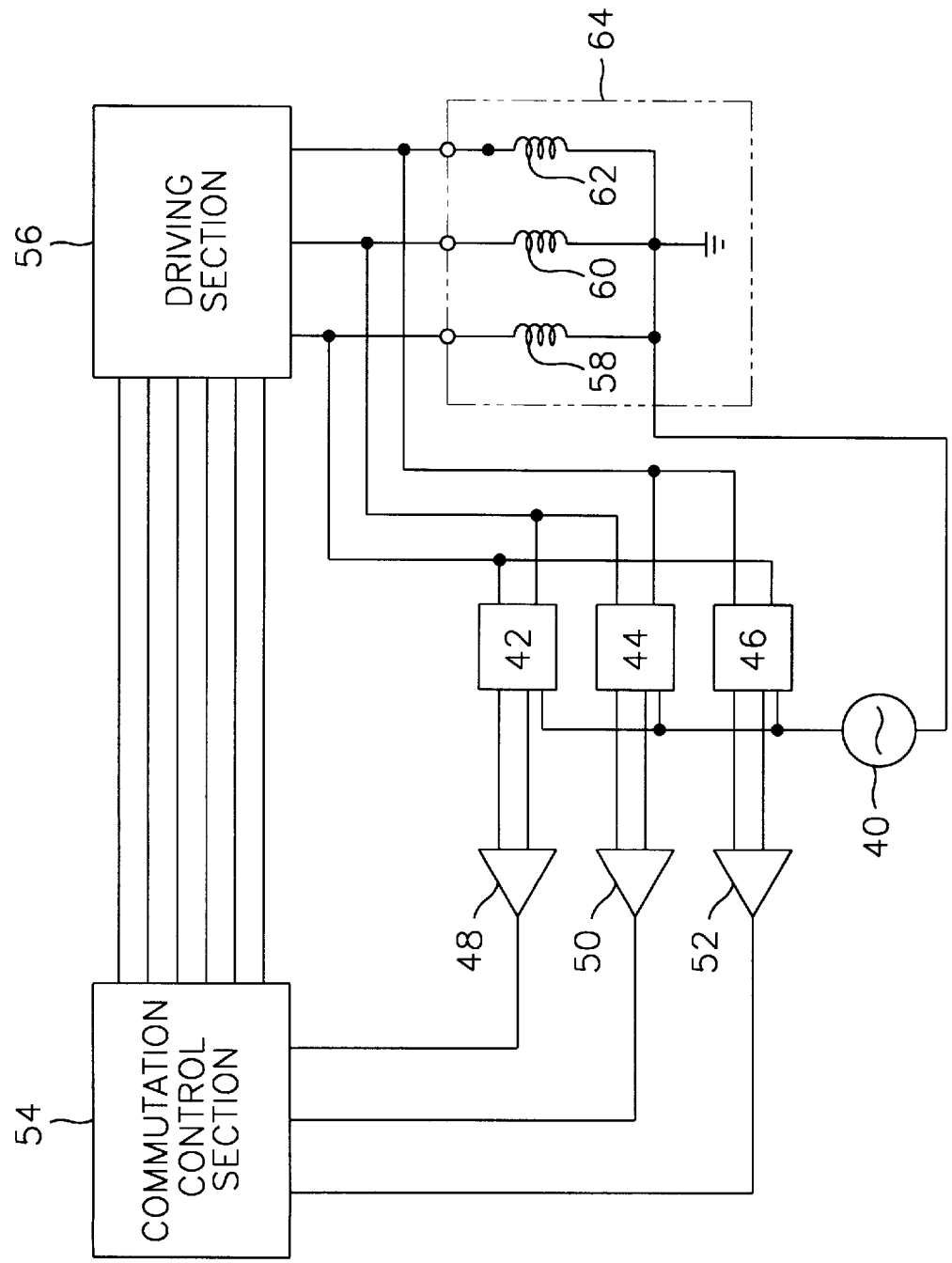
FIG. 7 is a circuit diagram of a sensorless motor having an inductance bridge circuit according to another embodiment of the present invention.

FIG. 7 shows a driving circuit of the sensorless DC motor having the inductance bridge circuit of the present invention. Referring to FIG. 7, the driving circuit includes an AC voltage source 40, bridge circuits 42, 44 and 46, amplifiers 48, 50 and 52, a commutation control section 54, a driving section 56, center-tapped winding phase coils 58, 60 and 62. Phase coils 58, 60 and 62 are installed in a motor case 64.

Figure 8:
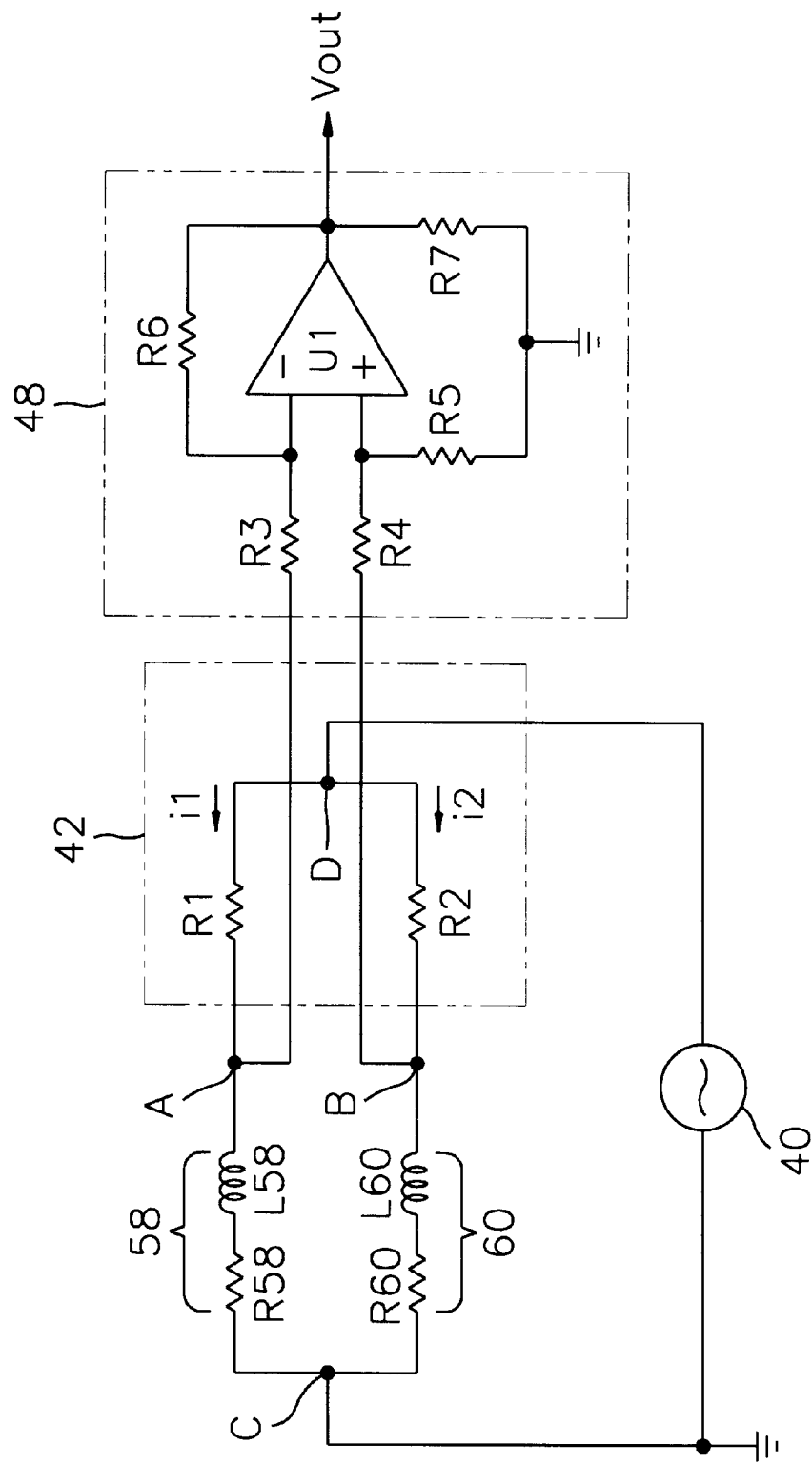
FIG. 8 is a detailed circuit diagram of the inductance bridge circuit shown in FIG. 7.

FIG. 8 shows a detailed circuit diagram of an inductance bridge circuit. Bridge circuit 42 for detecting the inductance voltage difference of two phase coils 58 and 60 includes a first input node C which is connected to one node of AC voltage source 40 and is in a center-tap position, a second input node D connected to the other node of AC voltage source 40, first and second resistors R1 and R2 each of which are connected between each side node of phase coils 58 and 60 and second input node D, and first and second output nodes A and B which serve as one side nodes of a couple of phase coils 58 and 60, each of which is connected to each of first and second resistors R1 and R2. Phase coil 58 includes an inner resistor R58 and an inductor L60.

An amplifier 48 is an operational amplifier U1 which is connected at a non-inversion terminal thereof to first output node A through a resistor R4 and is connected at an inversion terminal thereof to second output node A through a resistor R3. The non-inversion terminal of operational amplifier U1 is earthen through a resistor R5 and an output terminal thereof is earthen through a resistor R7. Between the inversion terminal and the output terminal, a resistor R6 is connected. Resistors R3 and R4 have a same resistance and resistors R5 and R6 have a resistance which is m times the resistance of R3 and R4.

Commutation control section 54 compares the amplitudes of the amplified differential inductance detected signals of the phase coils and determines that the remaining two phase coils except one phase coil which has the highest voltage amplitude are returned to an initial position where the two phase coils are magnetized. Commutation control section 54 compares the amplitudes of the amplified differential inductance detected signals at each predetermined rotor rotation angle, thereby determining the commutation.

Driving section 56 supplies driving currents to phase coils 58, 60 and 62 in response to a control of commutation control section 54.

The output voltage of each output node in bridge circuit 42 is evaluated by the following equations.

$$v_A(t) = v(t) - R_{58} i_1(t) - L_{58} \frac{d i_1(t)}{d t} \quad (6)$$

$$v_B(t) = v(t) - R_{60} i_2(t) - L_{60} \frac{d i_2(t)}{d t} \quad (7)$$

The output voltage Vout of the amplifier is represented by follows.

$$\text{Vout} = m(V_A - V_B) \quad (8)$$

If the resistance and the inductance of two phase coils 58 and 60, there is no voltage difference between two output nodes A and B. The inductance of the phase coil changes when there is a change in a relative position of a magnet pole with respect to the coil. Even though the resistances of two phase coils are the same, if there is an inductance change, a voltage difference is generated.

Figure 9:
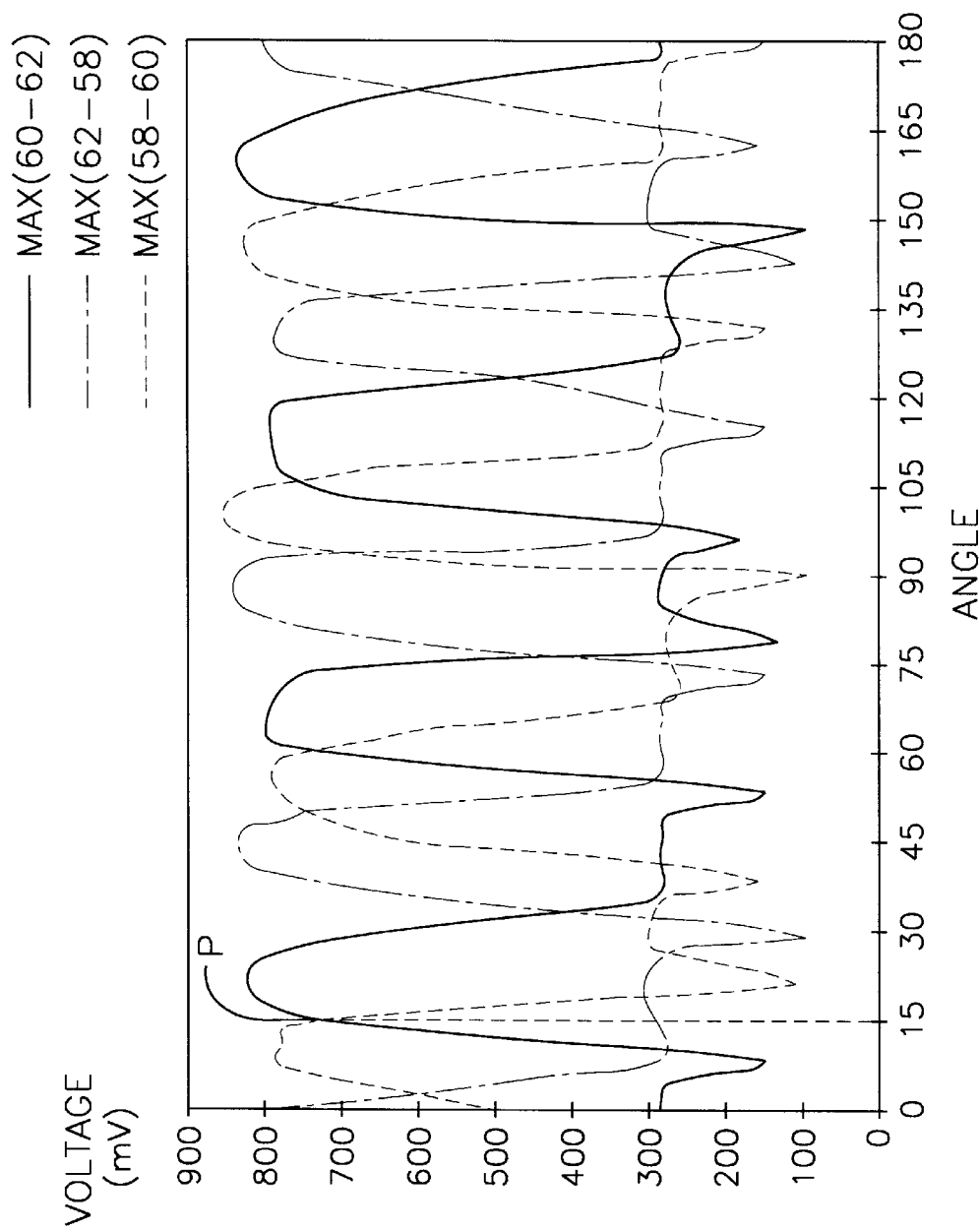
FIG. 9 is a graph showing a wave form of a maximum voltage of each inductance bridge circuit corresponding to rotary angles of the magnetic rotor when a square-wave is inputted.
Figure 10:
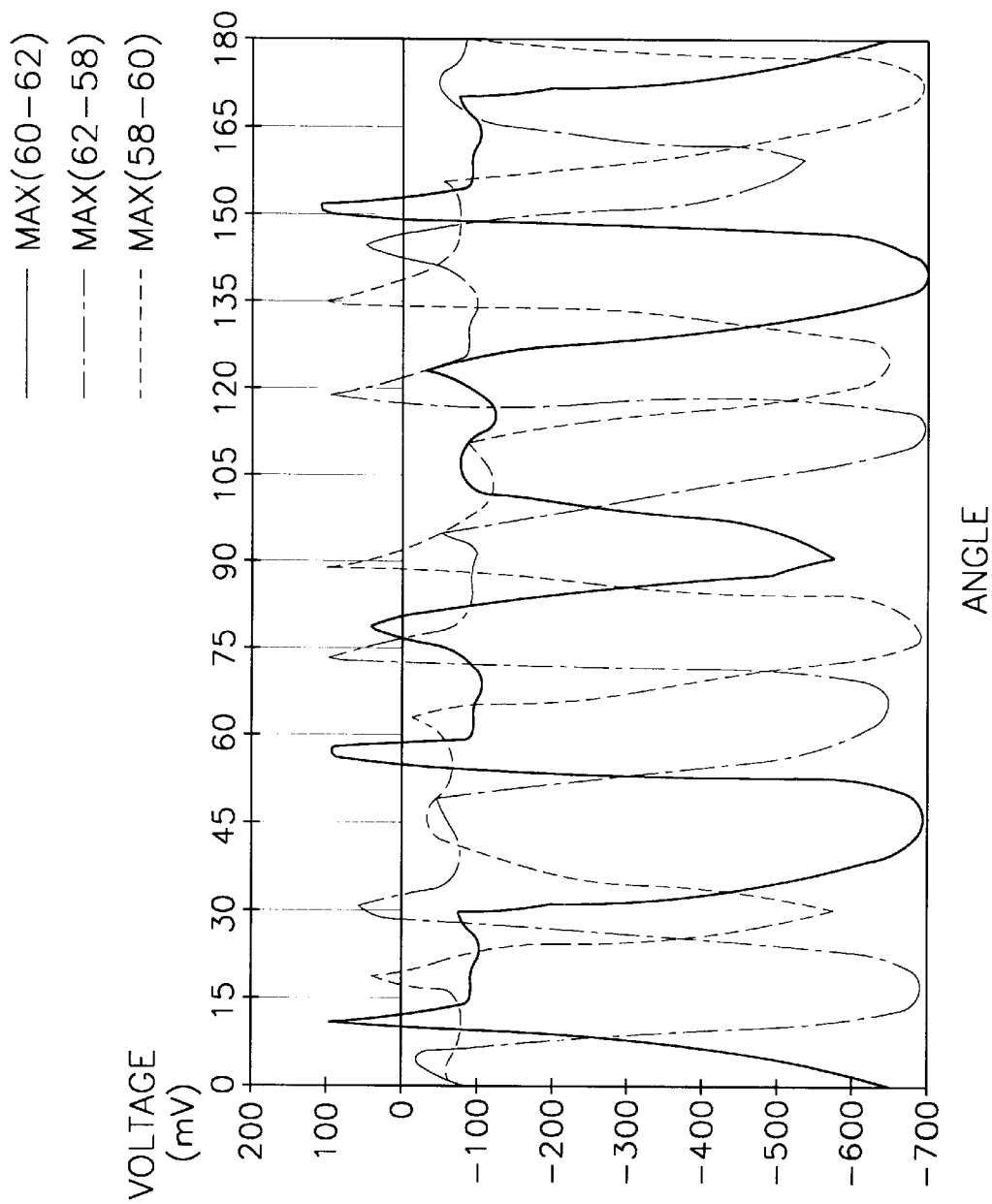
FIG. 10 is a graph showing a wave form of a minimum voltage of each inductance bridge circuit corresponding to rotary angles of the magnetic rotor when a square-wave is inputted.

When a rectangular wave of 10V, 100 kHz and a duty ratio of 25% is applied to the bridge circuit from AC voltage source 10, inductance differential voltage waves are generated as shown in FIGS. 9 and 10.

FIG. 9 shows waveforms of maximum voltages of the inductance bridge circuits in response to a rotation angle of the magnet rotor when the rectangular wave is applied thereto, while FIG. 10 shows a waveform of minimum voltages of the inductance bridge circuits in response to a rotation angle of the magnet rotor when the rectangular wave is applied thereto.

Referring to FIG. 9, the solid line represents the maximum inductance differential voltage between phase coils 60 and 62, and the dotted line represents that of phase coils 60 and 58. In FIG. 10, the solid line represents the minimum inductance differential voltage between phase coils 60 and 62, the one-dot chain line represents that of phase coils 60 and 58, and the dotted line represents that of phase coils 58 and 60.

In a paused state, input signals are applied to three couples of phase coils. A return signal from each couple of phase coils are detected and compared so that the commutation based on the maximum or the minimum voltage controls the rotor to rotate. However, two phase coils are used in determining the rotor position and the remaining phase coil is magnetized. At this time, the maximum voltage is used for determining a phase coil to be magnetized.

For example, the differential voltage between two phase coils 60 and 62 is higher than those of 62 and 58, and of 58 and 60, a driving current is applied to phase coil 58 so as to magnetize it for rotating the rotor. At the next 15 degrees rotated position of the rotor, phase coil 60 is magnetized.

If there are two maximum voltages, it is difficult to determine what phase coil should be magnetized. In this case, the minimum voltage is used for the commutation. For example, if there is a commutation change point P from phase coil 62 to 58 at 15 degrees, further if the output voltages are same, and still if the output voltage of 62 and 58 is lower than that of 60 and 62, and that of 58 and 60, the commutation magnetizes phase coil 58 so that the rotor rotates in a proper direction.

Figure 11:
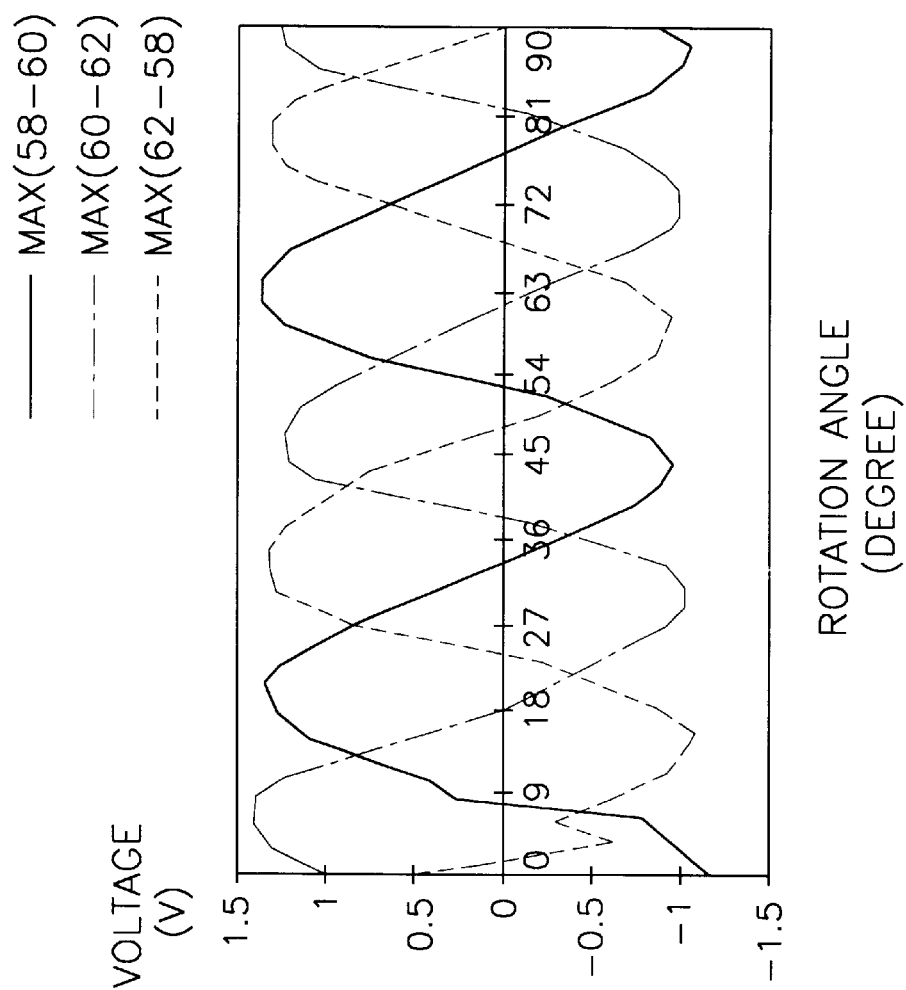
FIG. 11 is a graph showing a wave form of a differential voltage between two phase coils when a sine wave is inputted.

FIG. 11 is a waveform diagram of an inductance differential voltage in response to a rotated angle of the rotor when a sine wave is inputted. The solid line represents the inductance differential voltage between two phase coils 58 and 60, and the dotted line represents the inductance differential voltage between two phase coils 60 and 62. In this case, the sine wave of 10V and 50 kHz is inputted to the bridge circuit from AC voltage source 40.

In FIG. 11, the differential voltages are detected at T=15 μs where the input signal reaches its minimum value.

For example, at a rotating angle of 36 degrees of the rotor, the differential voltage between two phase coils 62 and 58 is higher than those of the remaining phase coils. Thus, phase coil 60 must be magnetized in order to rotate the rotor. Phase coil 60 is continuously magnetized while the differential voltage between two phase coils 62 and 58 being higher than those of the remaining phase coils.

Figure 12:
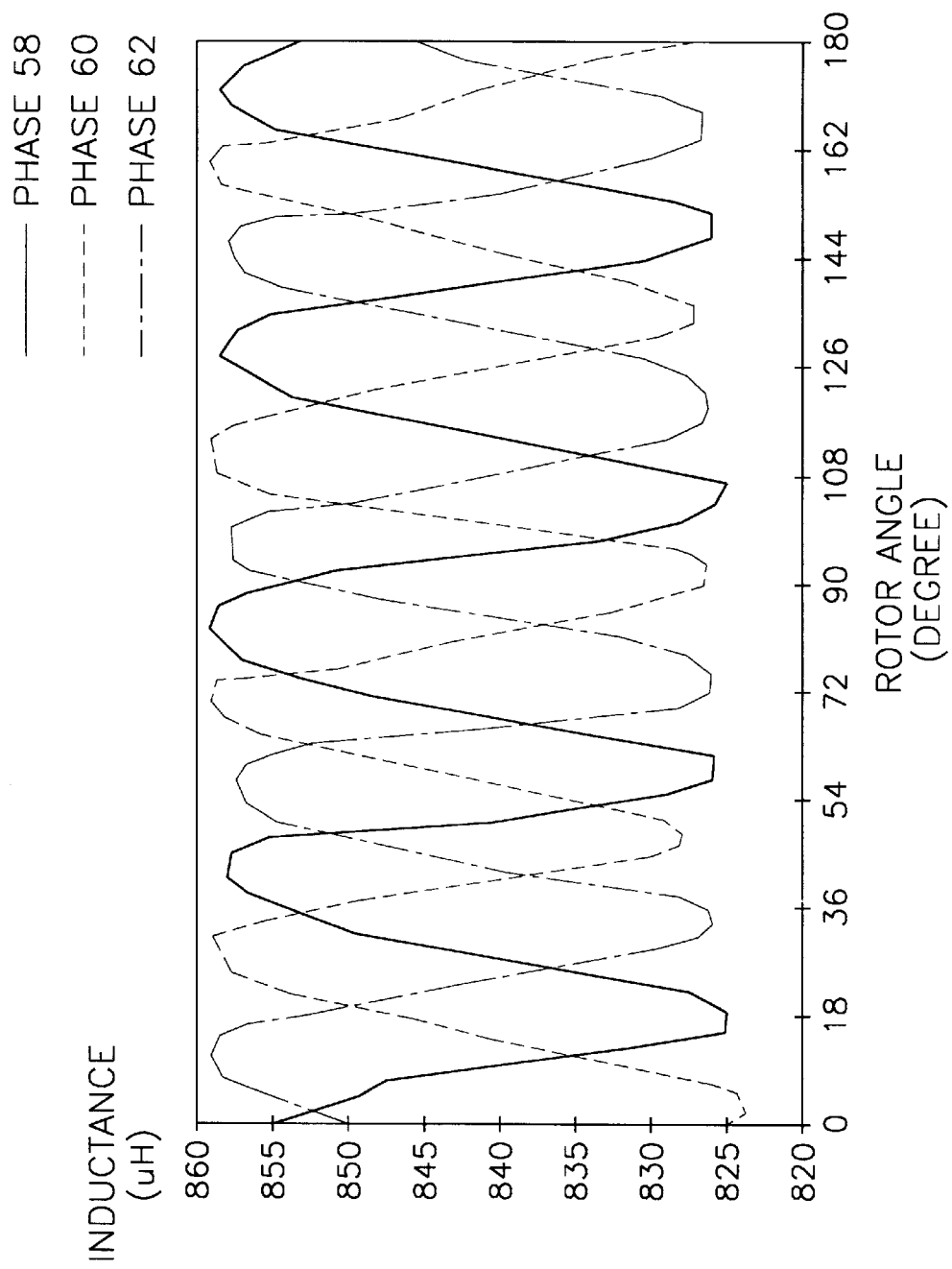
FIG. 12 is a graph showing an inductance of each phase coil corresponding to rotary angles of the rotor.

While the rotor rotates within a range of 28 to 43 degrees wherein phase coil 60 is in a magnetized condition, the inductance of phase coil 60 decreases while the inductances of the remaining phase coils increase as shown in FIG. 12. FIG. 12 shows the inductance of each phase coil in response to the rotation of the rotor.

Figure 13:
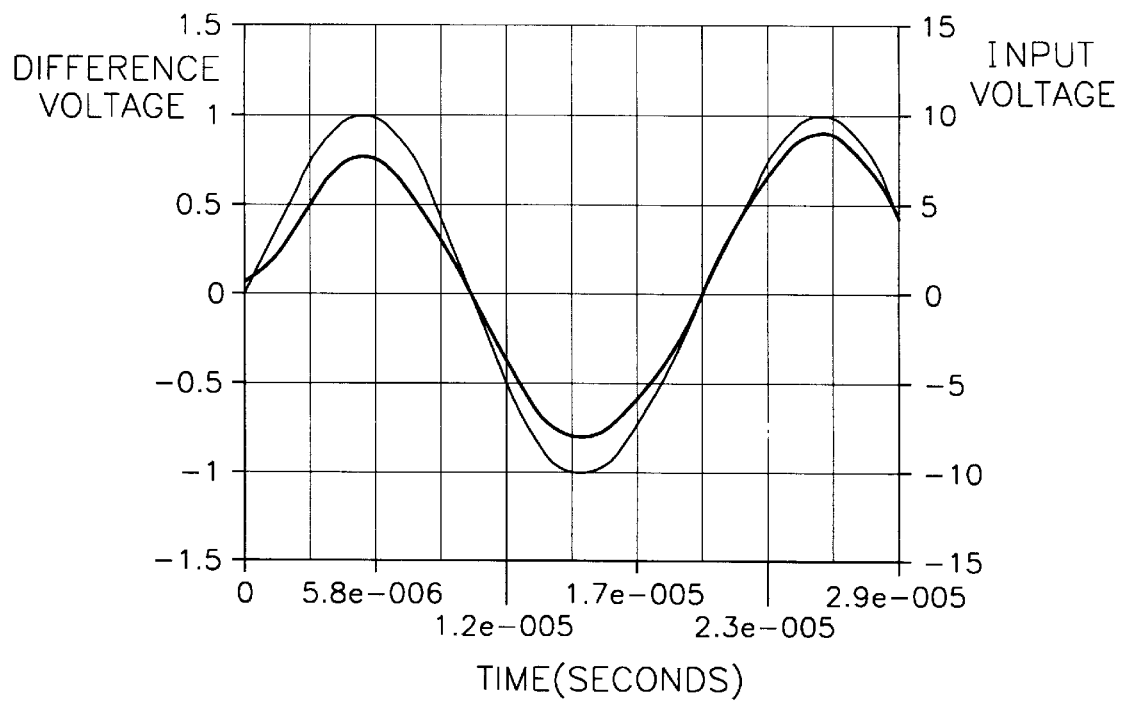
FIG. 13 is a graph showing a phase difference between an input signal and a differential voltage signal in the condition of L1>L2.

FIG. 13 shows a phase relationship of the input signal and the differential voltage signal in the condition of $L_{60}$ being higher than $L_{58}$. From FIG. 13, we can find that the input signal and the differential voltage signal have a same phase.

Figure 14:
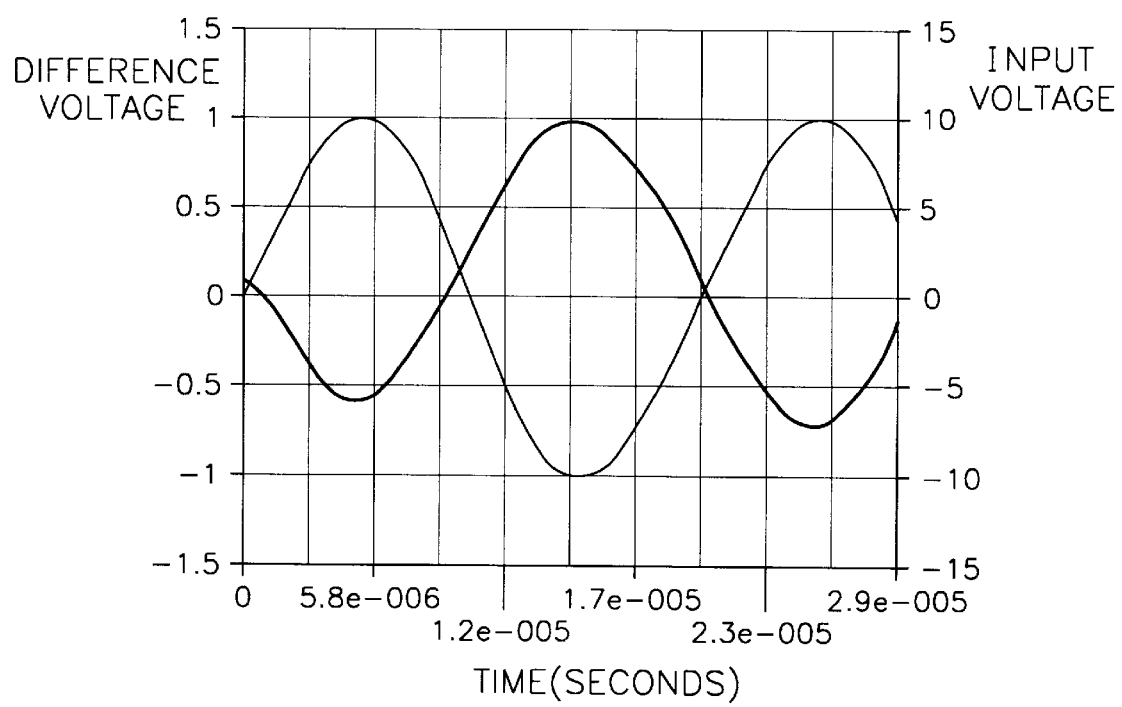
FIG. 14 is a graph showing a phase difference between an input signal and a differential voltage signal in the condition of L2>L1.

FIG. 14 shows a phase relationship of the input signal and the differential voltage signal in the condition of $L_{60}$ being lower than $L_{58}$. From FIG. 14, we can find that the input signal and the differential voltage signal have different phases.

Besides the maximum differential voltage, the above described phase transition information can be used in a proper commutation.

Figure 15:
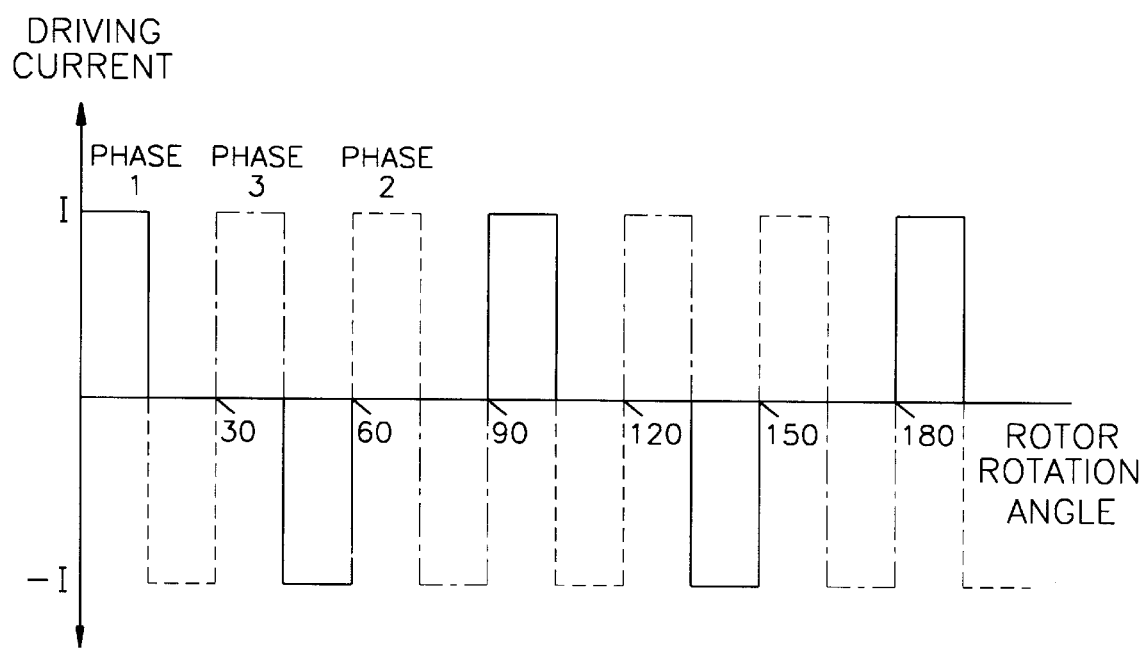
FIG. 15 is a view showing an energizing sequence of phase coils.

FIG. 15 shows the magnetization sequence of each phase coil. At first, until the rotor rotation angle of 15 degrees, a driving current in a positive direction is applied to phase coil 58. During the rotor rotation angle of 15 to 30 degrees, a driving current in a negative direction is applied to phase coil 60, and during the rotor rotation angle of 30 to 45 degrees, a driving current in the positive direction is applied to phase coil 62. Thus, the commutation is determined so as to magnetize the phase coils in the order of 58, 60, 62 and 58.

Although the preferred embodiment of the invention has been described, it is understood that the present invention

9 should not be limited to this preferred embodiment, but various changes and modifications can be made by one skilled in the art within the spirit and scope of the invention as hereinafter claimed.

What is claimed is:

1. A method of driving a sensorless DC motor including a rotor having Y-winding phase coils and a plurality of magnetic poles, the method comprising the steps of:

applying an alternating current voltage signal to bridge circuits coupled to the phase coils, respectively;

inputting an output voltage signal of each of the bridge circuits as an inductance detecting signal of each of the phase coils;

amplifying the inputted inductance detecting signal of each of the phase coils;

comparing a value of the amplified inductance detecting signal of each of the phase coils with each other; and determining an initial position of the rotor for rotating the rotor, the phase coils except for a phase coil having a maximum inductance detecting signal being magnetized at the initial position.

2. The method as claimed in claim 1, further comprising the steps of rotating the rotor and determining a commutation by comparing the values of the inductance detecting signals at each predetermined rotary angle of the rotor with each other.

3. The method as claimed in claim 2, wherein the rotor has eight magnetic poles and each phase coil includes two coils so that the commutation is determined at every fifty degrees of the rotary angles of the rotor.

4. The method as claimed in claim 1, wherein the alternating current voltage signal is a square-wave having 10 voltages, 100 kHz of frequencies, and 25% of duty ratio.

5. The method as claimed in claim 1, wherein the bridge circuit is an Owen bride circuit.

6. An apparatus for driving a sensorless DC motor including a rotor having Y-winding phase coils and a plurality of magnetic poles, the apparatus comprising:

an alternating current voltage source for providing an alternating current voltage signal;

bridge circuits which receive the alternating current voltage signal so as to detect a differential voltage signal between a reference voltage signal and a terminal voltage signal of the phase coils thereby outputting an inductance detecting signal, the bridge circuits being respectively connected to the phase coils;

amplifiers for amplifying each inductance detecting signal of each of the bridge circuits;

a commutation control section for comparing a value of the amplified inductance detecting signal of each of the phase coils with each other, for determining an initial position in which the phase coils except for a phase coil having a maximum inductance detecting signal are magnetized and for determining a commutation by comparing the values of the inductance detecting signals at each predetermined rotary angle of the rotor with each other; and a driving section for providing a driving current to a pair of phase coils in response to a control signal of the commutation control section.

7. The apparatus as claimed in claim 6, wherein each of the bridge circuits comprises a first input terminal which is connected to a first terminal of the altering current voltage source and is a common connecting point of the Y-winding, a second input terminal connected to a second terminal of

10 the alternating current voltage source, a first resistance and a first capacitor which are connected between the first and second input terminals in a series, a second resistance and a second capacitor which are connected between a first terminal of each phase coil and the first terminal of the alternating current voltage source in a series, a first output terminal provided at the first terminal of each phase coil, and a second output terminal which is a common connecting point of the first resistance and capacitor.

8. The apparatus as claimed in claim 7, wherein the bridge circuits are installed at a space in which the phase coils are installed, for satisfying a common temperature condition.

9. The apparatus as claimed in claim 6, wherein the rotor has eight magnetic poles and each of the phase coils includes two coils so that the commutation is determined at every fifty degrees of the rotary angles of the rotor.

10. The apparatus as claimed in claim 6, wherein the alternating current voltage signal is a square-wave having 10 voltages, 100 kHz of frequencies, and 25% of duty ratio.

11. A method of driving a sensorless DC motor including a rotor having center-tapped winding phase coils and a plurality of magnetic poles, the method comprising the steps of:

sequentially applying an alternating current voltage signal to bridge circuits coupled to pairs of the phase coils, respectively;

inputting an output voltage signal of each of the bridge circuits as a differential inductance detecting signal of each of the pairs of the phase coils;

amplifying the inputted differential inductance detecting signal of each of the pairs of the phase coils;

comparing the value of the amplified differential inductance detecting signal of each of the pairs of the phase coils to each other; and determining an initial position of the rotor for rotating the rotor, the phase coils except for a phase coil having a maximum differential inductance detecting signal being magnetized at the initial position.

12. The method as claimed in claim 11, further comprising the steps of rotating the rotor and determining a commutation by comparing the values of the differential inductance detecting signals at each predetermined rotary angle of the rotor to each other.

13. The method as claimed in claim 12, wherein the rotor has eight magnetic poles and each of the phase coils includes two coils so that the commutation is determined at every fifty degrees of the rotary angles of the rotor.

14. The method as claimed in claim 11, wherein the alternating current voltage signal is a square-wave having 10 voltages, 100 kHz of frequencies, and 25% of duty ratio.

15. An apparatus for driving a sensorless DC motor including a rotor having center tapped winding phase coils and a plurality of magnetic poles, the apparatus comprising:

an alternating current voltage source for providing an alternating current voltage signal;

bridge circuits which receive the alternating current voltage signal so as to detect a differential voltage signal between a reference voltage signal and a terminal voltage signal of the phase coils thereby outputting a differential inductance detecting signal, each of the bridge circuits being connected to a pair of the phase coils;

amplifiers for amplifying each differential inductance detecting signal of each bridge circuit;

a commutation control section for comparing a value of the amplified differential inductance detecting signal of each of the pairs of phase coils with each other, for determining an initial position in which the phase coils except for a pair of phase coils having a maximum differential inductance detecting signal are magnetized, and for determining a commutation by comparing the values of the differential inductance detecting signals at each predetermined rotary angle of the rotor to each other; and a driving section for providing a driving current to each of the phase coils in response to a control signal of the commutation control section.

16. The apparatus as claimed in claim 15, wherein each of the bridge circuits comprises a first input terminal which is connected to a first terminal of the alternating current voltage source and is center-tapped, a second input terminal connected to a second terminal of the alternating current voltage source, first and second resistances which are connected between a first terminal of each phase coil and the second input terminal, and first and second output terminals which are provided at first terminals of a pair of phase coils connected to first and second resistances, respectively.

17. The apparatus as claimed in claim 15, wherein the rotor has eight magnetic poles and each of the phase coils includes two coils so that the commutation is determined at every fifty degrees of the rotary angles of the rotor.

18. The apparatus as claimed in claim 15, wherein the alternating current voltage signal is a square-wave having 10 voltages, 100 kHz of frequencies, and 25% of duty ratio.

19. The apparatus as claimed in claim 15, wherein the alternating current voltage signal is a sine-wave having 10 voltages and 50 kHz of frequencies.

* * * * *